United States Patent [19]

Lee

[11] Patent Number: 5,090,749
[45] Date of Patent: Feb. 25, 1992

[54] EXPANDING CARAVAN

[75] Inventor: David C. Lee, Geraldton, Australia

[73] Assignee: Christopher M. Counsel, Geraldton, Australia

[21] Appl. No.: 638,367

[22] Filed: Jan. 4, 1991

[30] Foreign Application Priority Data

Jan. 8, 1990 [AU] Australia ............... PJ8119

[51] Int. Cl.$^5$ ............................................. B60R 27/00
[52] U.S. Cl. ............................... 296/171; 296/26; 296/175
[58] Field of Search ............... 296/171, 175, 172, 173, 296/26; 52/67

[56] References Cited

U.S. PATENT DOCUMENTS

| | | | |
|---|---|---|---|
| 4,049,310 | 9/1977 | Yoder | 296/26 |
| 4,128,269 | 12/1978 | Stewart | 296/171 |
| 4,500,132 | 2/1985 | Yoder | 296/171 |
| 4,930,837 | 6/1990 | Marsh et al. | 296/26 |

FOREIGN PATENT DOCUMENTS

79691/82 1/1982 Australia.
83439/82 7/1985 Australia.
36899/84 4/1988 Australia.

*Primary Examiner*—Robert R. Song
*Attorney, Agent, or Firm*—Christie, Parker & Hale

[57] ABSTRACT

The invention relates to an expanding caravan comprising first and second modules wherein the caravan has a contracted condition in which the second module is received by the first module and an expanded condition in which the second module is displaced relative to the first module to increase the usable floor space.

11 Claims, 10 Drawing Sheets

EXPANDING CARAVAN

BACKGROUND OF THE INVENTION

The present invention relates to an expanding caravan. Traditionally, caravans are limited in size and shape by rules and regulations governing vehicles that may be towed on public roads.

SUMMARY OF THE INVENTION

In accordance with one aspect of the present invention there is provided an expanding caravan comprising a first module having a roof, a floor and opposite ends and at least one second module having a roof, a floor and opposite ends receivable by the first module, wherein the caravan has a contracted condition in which the or each second module is received by the first module such that the floor of the or each second module overlies the floor of the first module and an expanded condition in which the or each second module is displaced relative to the first module to increase the usable floor space.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
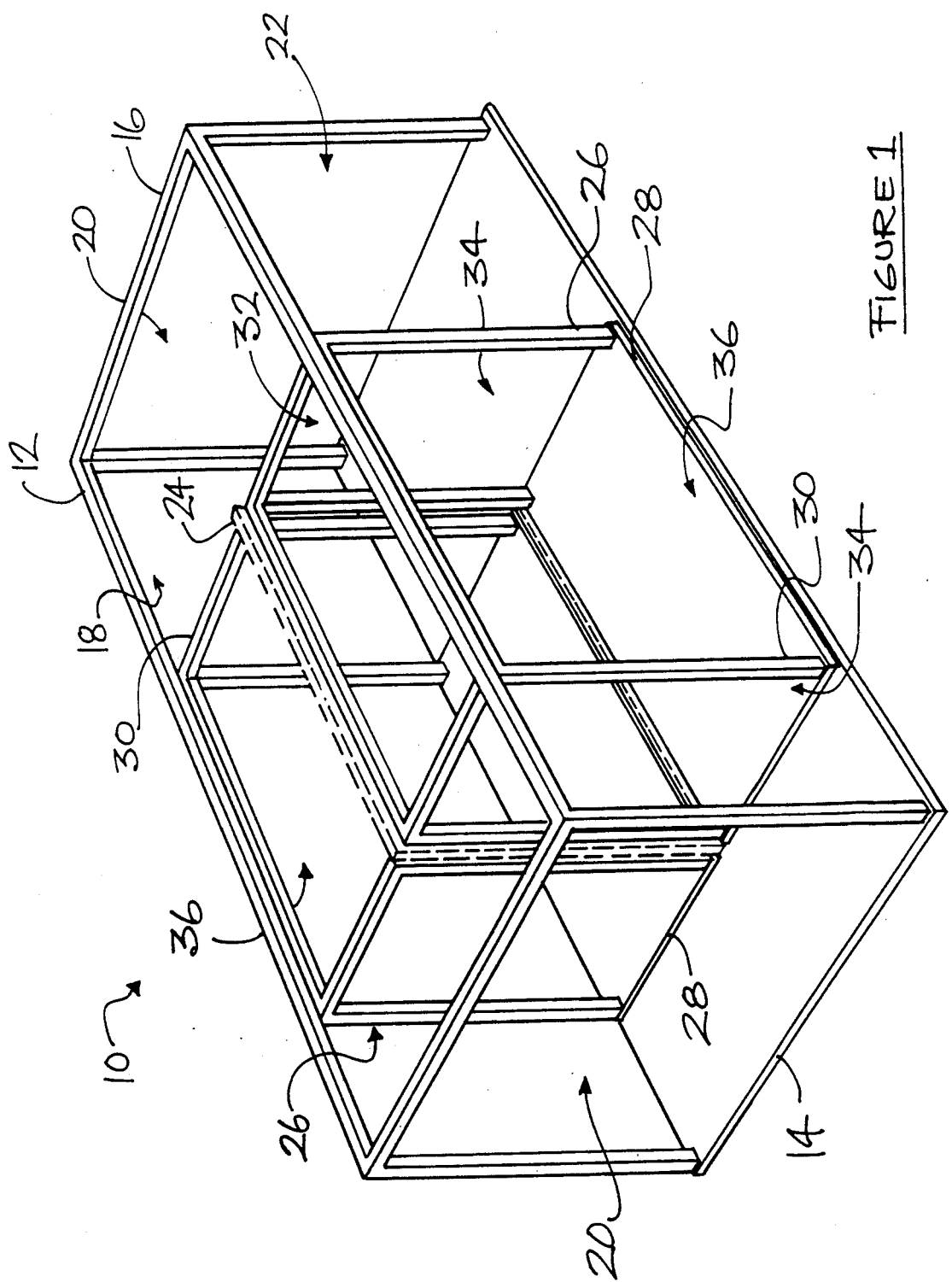
FIG. 1 is a schematic perspective view of an expanding caravan in accordance with the present invention shown in a contracted condition.
Figure 2:
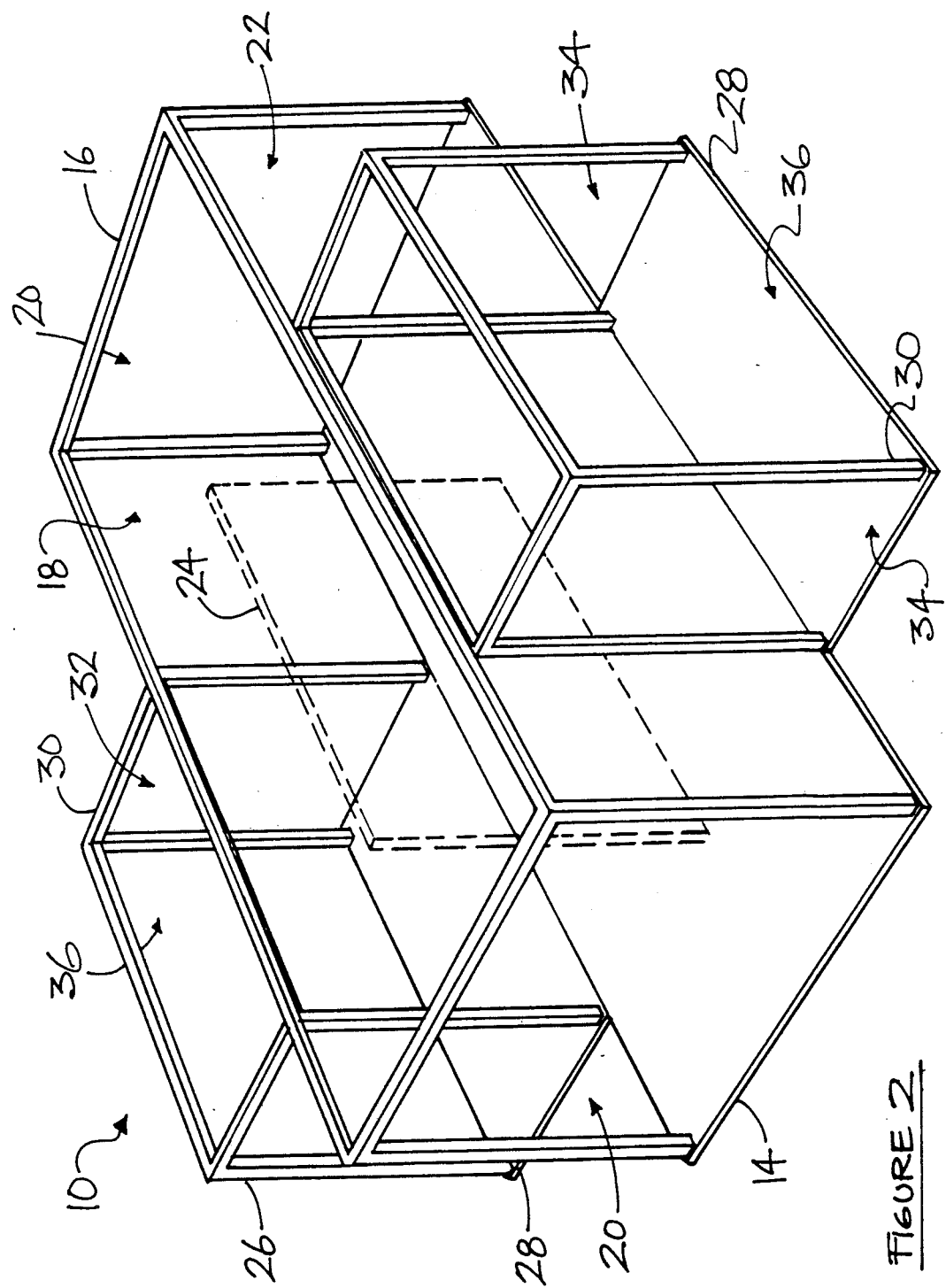
FIG. 2 is a schematic perspective view of the expanding caravan of FIG. 1 shown in an expanded condition.

Shown in FIGS. 1 and 2 is an expanding caravan 10 comprising a central first module 12 having a floor 14 and a frame 16. The frame 16 defines a roof 18, ends 20 and side walls 22. Located between the ends 20 is a central longitudinal wall 24. The central wall 24 helps to strengthen and stiffen the first module 12. The caravan 10 further comprises two outer second modules 26. Each second module 26 is disposed on a respective side of the first module 12, adjacent the wall 24. Each second module 26 has a floor 28 and a frame 30. The frame 30 defines a roof 32, end walls 34 and an outer wall 36. In the contracted position shown in FIG. 1 the second modules 26 are positioned adjacent to the central wall 24. In addition, the floor 28 of the second modules 26 overlays the floor 14 of the first module 12.

The outer walls 36 of the second modules 26 do not project substantially past the side walls 22 of the first module 12, as can be seen in FIG. 1.

When the caravan 10 has been expanded the second modules 26 project well past the side walls of the first module, as is best seen in FIG. 2. In this position, the floor 28 of each second module 26 sits flush with the floor 14 of the first module 12. However, the roof 32 of each second module 26 is at a lower level than the roof 18 of the first module 12 when in both the contacted and expanded positions.

Figure 3:
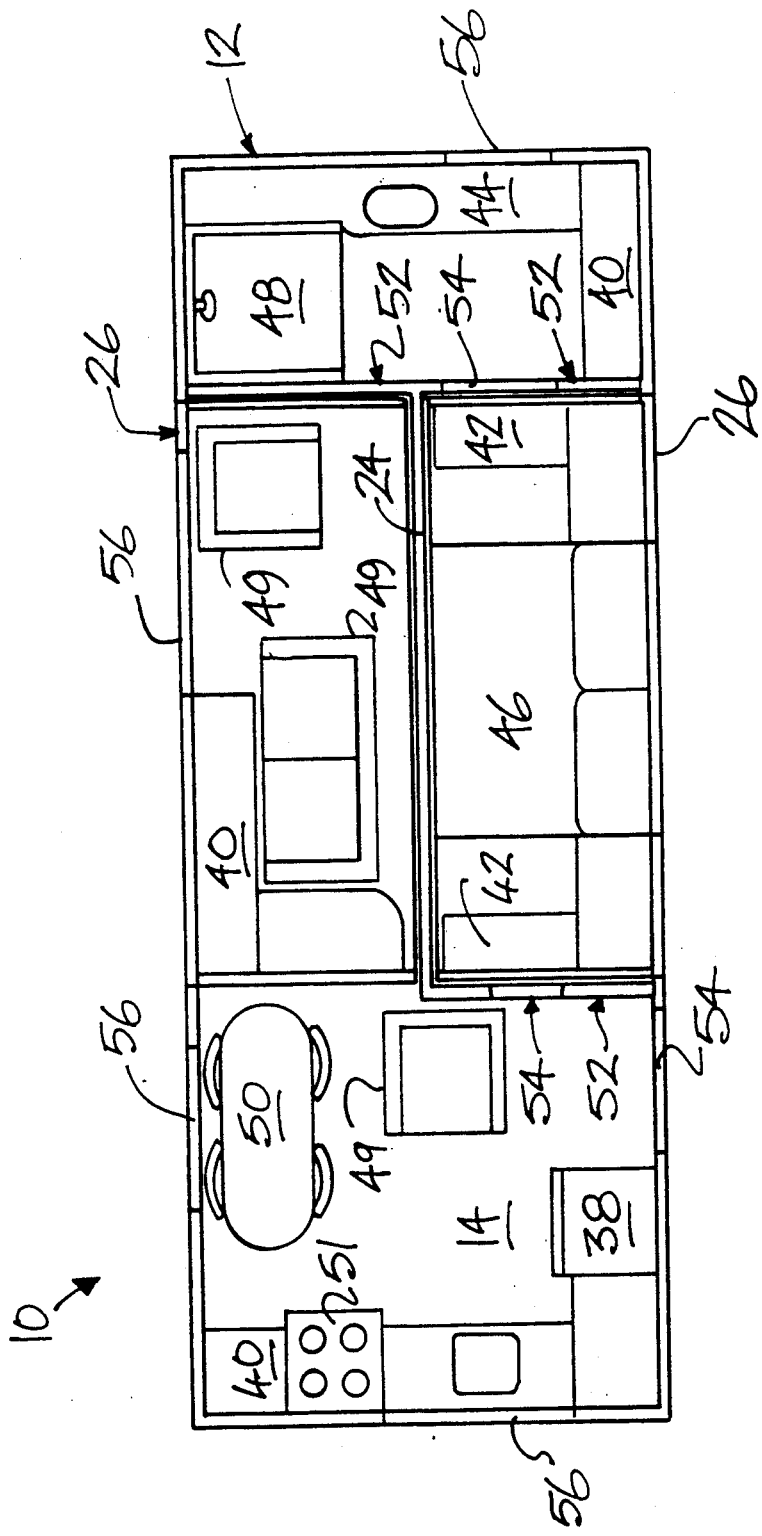
FIG. 3 is a plan view of a floor plan of the expanding caravan of FIG. 1 shown in a contracted condition.
Figure 4:
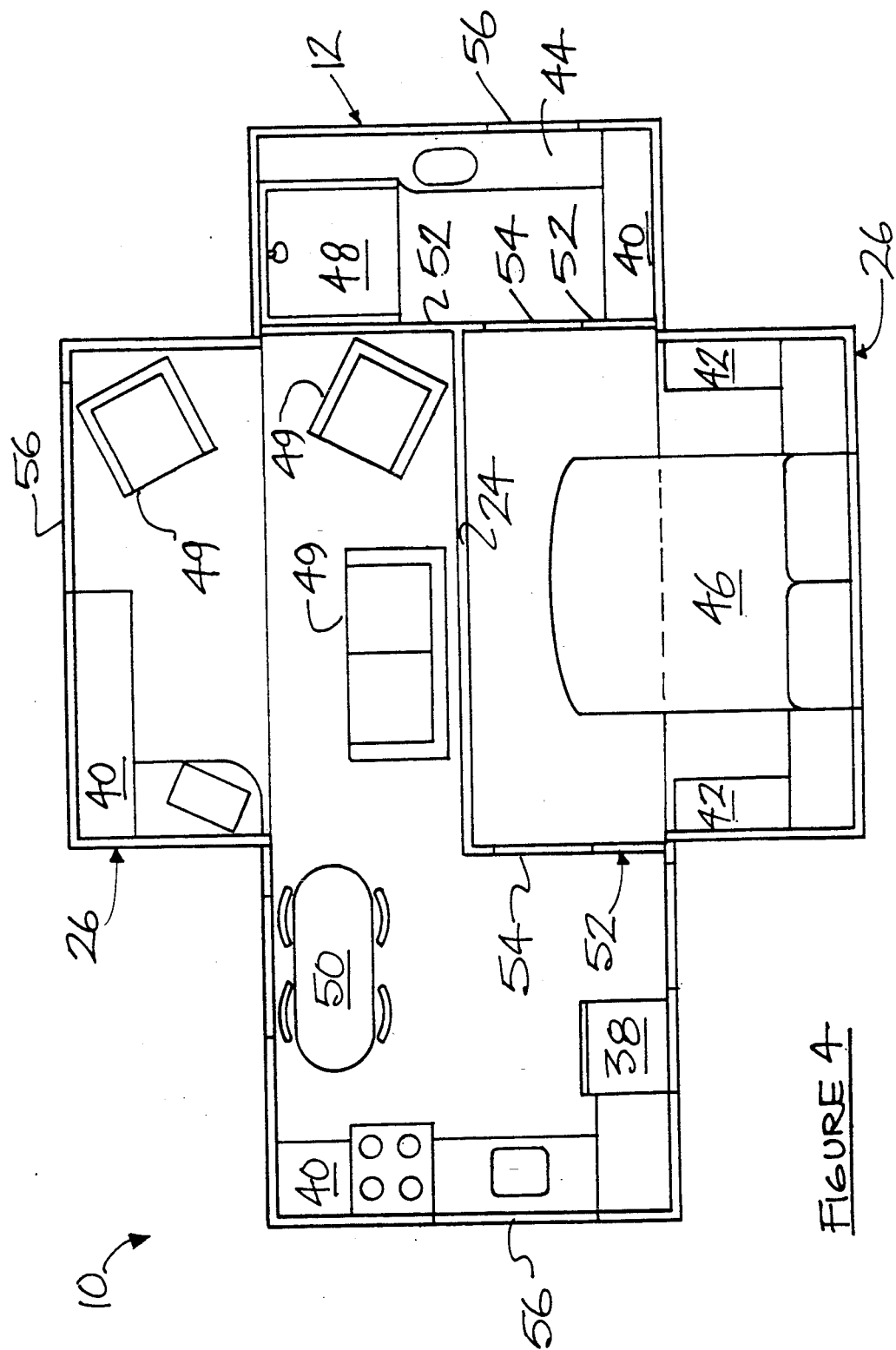
FIG. 4 is a plan view of a floor plan of the expanding caravan of FIG. 1 shown in an expanded condition.

In FIGS. 3 and 4 there is shown a possible floor plan for the caravan 10. The caravan 10 may have located therein a plurality of items. Typically, these items may be a fridge 38, cupboards 40, robes 42, a vanity cabinet 44, a bed 46, a shower 48 a lounge suite 49, a dining setting 50 and stove 51.

In addition to the central wall 24 there are provided a number of dividing walls 52 extending therefrom. The dividing walls 52 have located therein a number of doors 54 to allow passage therethrough. The dividing walls 52 have a door 54 positioned therein to allow access into the first module 12 of the caravan 10. A number of windows 56 are located in both the ends 20 and the side walls 22 of the first module 12. There are also windows 56 located in the outer walls 36 of each second module 26.

When in a contracted position as shown in FIG. 3 those items to be located in each second module 26 are positioned on the floor 28 thereof, the lounge suite 49 for example. When the second modules 26 are moved into the expanded position shown in FIG. 4 the lounge suite 49 may be moved onto the floor 14 of the first module 12.

It is important to note that the first module 12 will always be longer than the second modules 26. Also, the height of the roof 18 of the first module 12 will always be higher than the roof 32 of the second modules 26. The width of the first module 12 will be at least as wide as the combined width of the second modules 26.

Figure 5:
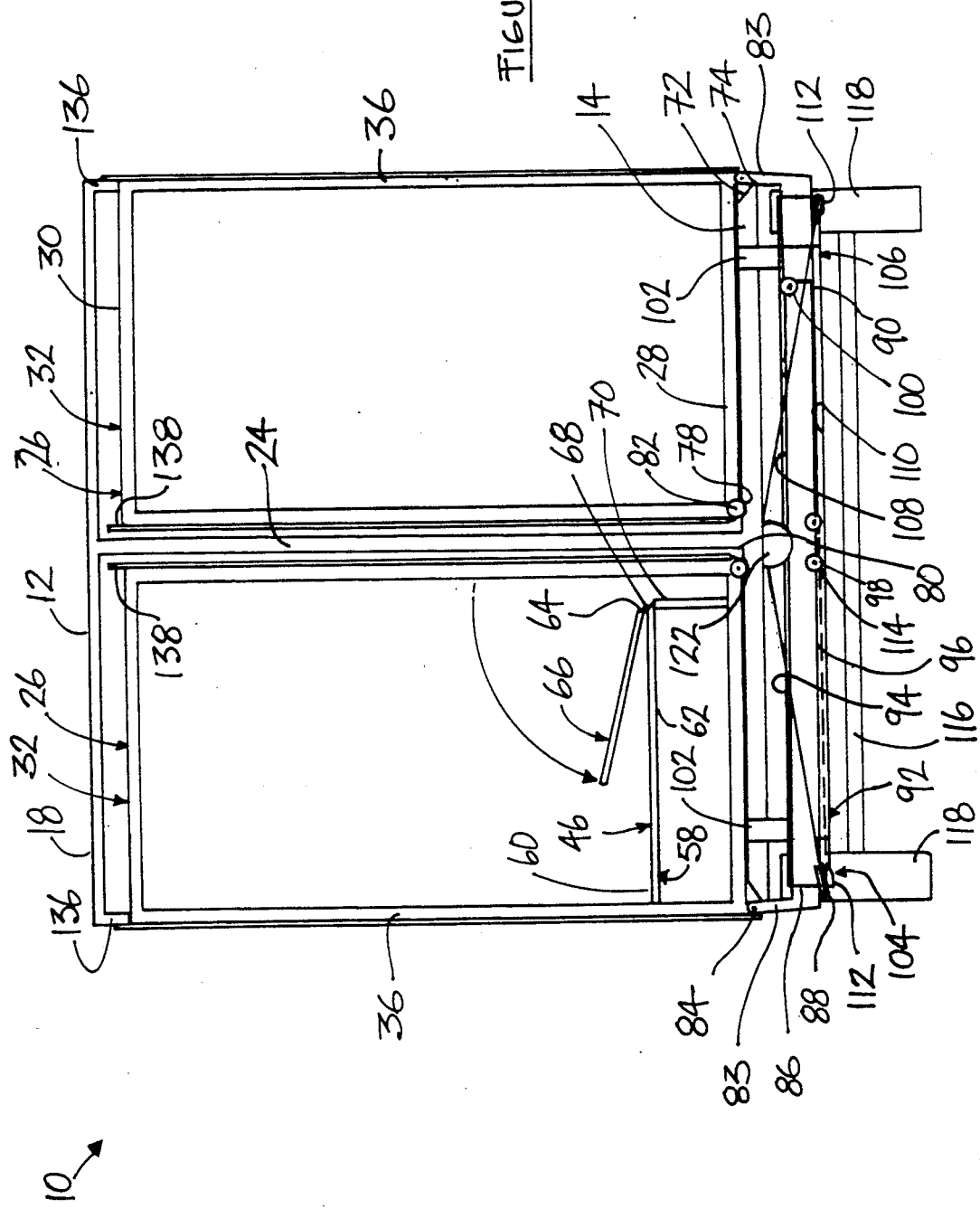
FIG. 5 is a cross sectional end view of an expanding caravan in accordance with the present invention shown in a contracted condition.
Figure 6:
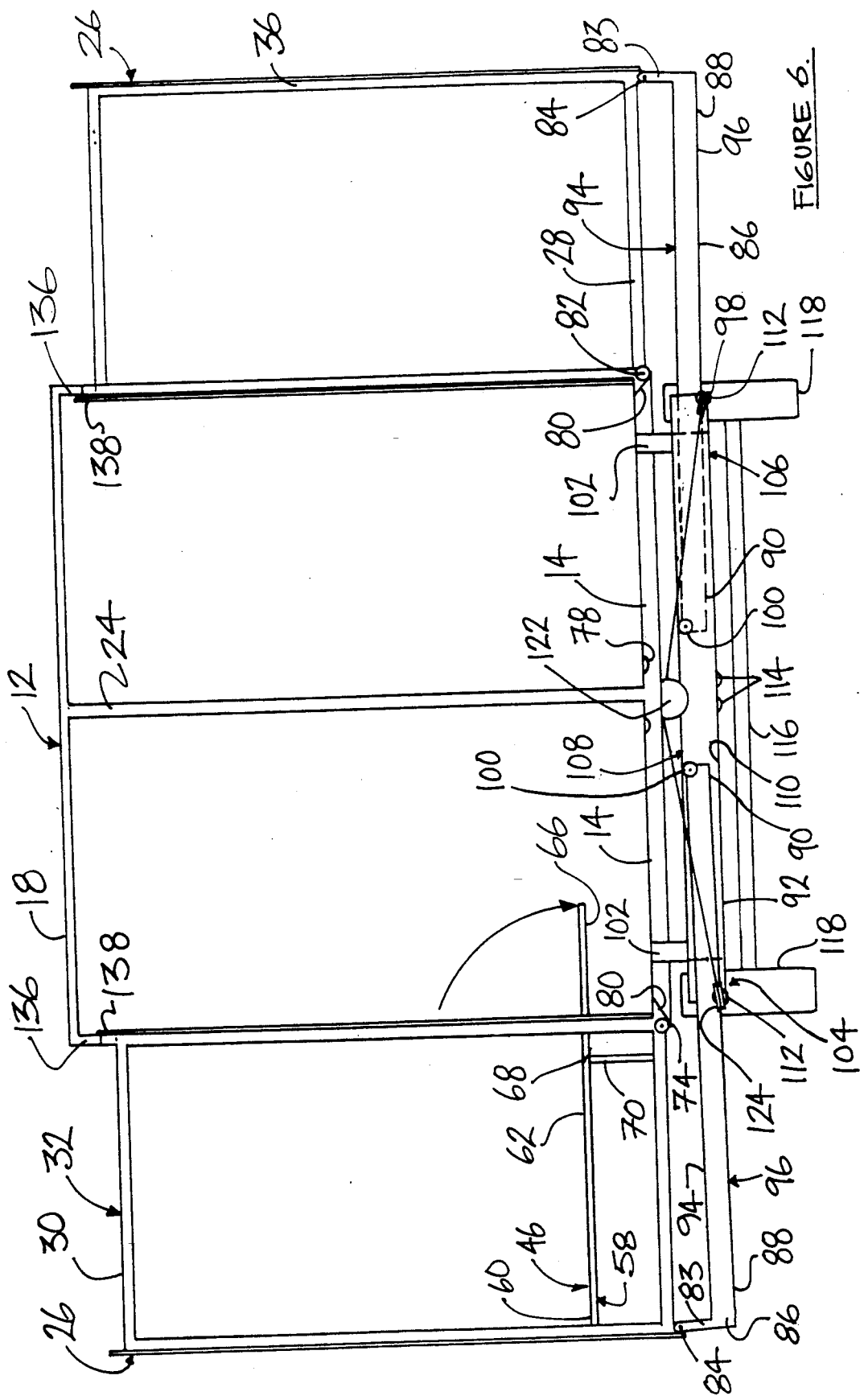
FIG. 6 is a cross sectional end view of the expanding caravan of FIG. 5 shown in an expanded condition.

In FIGS. 5 and 6 there are shown cross sections of the caravan 10 in both contracted and expanded positions. As noted above, a bed 46 is provided in one of the second modules 26. The bed 46 comprises a first portion 58 having a first end 60 and a second end 62. The bed 46 is mounted firstly to the outer wall 36 at a point above the floor 28. The bed 46 then extends towards the central wall 24 parallel with the floor 28. The first end 60 is attached to the outer wall 36. The second end 62 is chamfered and pivotally connected to a complementary chamfered end 64 of a second portion 66. A hinge 68 allows the second portion 66 to pivot relative to the first portion 58 about an axis generally parallel to the outer wall 36. A support means 70 is provided to support the second end 62 of the first portion 58 above the floor 28.

The floor 14 of the first module 12 has a chamfered longitudinal lower edge 72. The edge 72 has a lower lip 74 with a plurality of spaced recesses (not shown). There are a corresponding number of spaced recesses 78 in the floor 14 adjacent the central wall 24.

The floor 28 of each second module 26 has a chamfered lower longitudinal edge 80. The edge 80 is chamfered in a complementary manner to the edge 72 of the floor 14 of the first module 12. The floor 28 has provided thereunder a plurality of spaced rollers 82 adjacent the edge 80. The floor 28 of each second module 26 has two downwardly depending pairs of legs 83. The legs 83 are attached to the floor 28 by way of a pivot 84 about which pivotal movement may occur.

Each pair of legs 83 is attached to a sliding member 86. Each member 86 has a first end 88 and a second end 90. The legs 83 extend upwardly from the first end 88 to the pivot 84. Each member 86 extends transversely underneath the caravan 10 and is received in a transverse sleeve 92. Each member 86 has a top face 94 and a bottom face 96. Approximately midway along each bottom face 96 is located a roller 98. Also, a roller 100 is mounted at the second end 90 centrally in the member 86 adjacent the top face 94 of the member 86.

The transverse sleeves 92 are suspended below the floor 14 of the first module 12 by way of longitudinal members 102 shown only in FIGS. 5 and 6. Each sleeve 92 has a first end 104 and a second end 106. In addition, each sleeve 92 has a top surface 108 and a lower surface 110. Provided in the lower surface 110 at each of the ends 104 and 106 is a respective recess 112. Approximately midway between the first and second ends, 104 and 106 respectively, of the sleeve is located a pair of recesses 114. Each of recesses 112 and 114 is designed to receive a roller 98 of a member 86 as is shown in FIGS. 5 and 6.

Also provided below the first module 12 is a pair of axles 116 and wheels 118 attached thereto.

Figure 7:
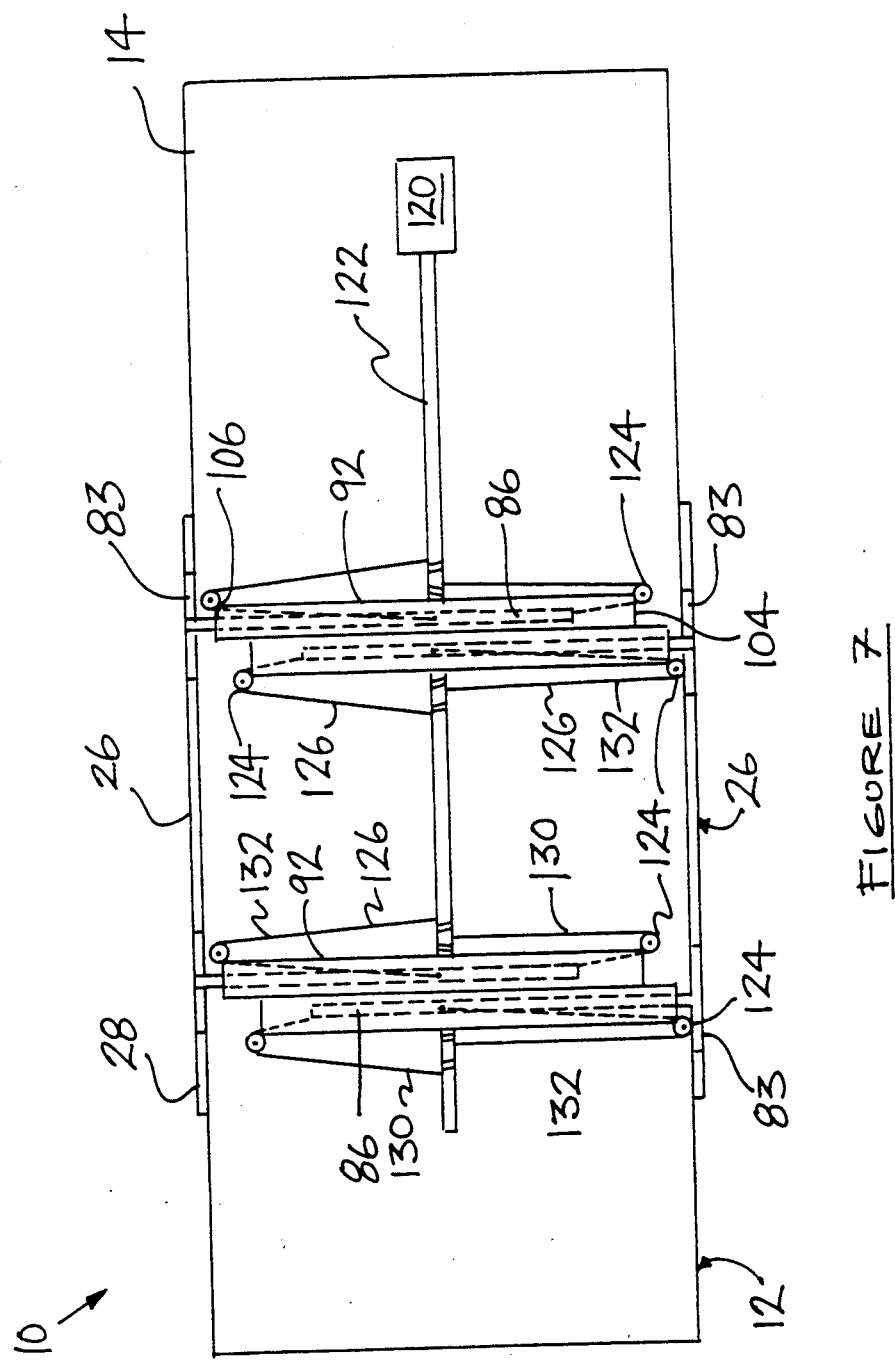
FIG. 7 is a bottom plan view of the expanding caravan of FIG. 5 shown in a contracted condition.
Figure 8:
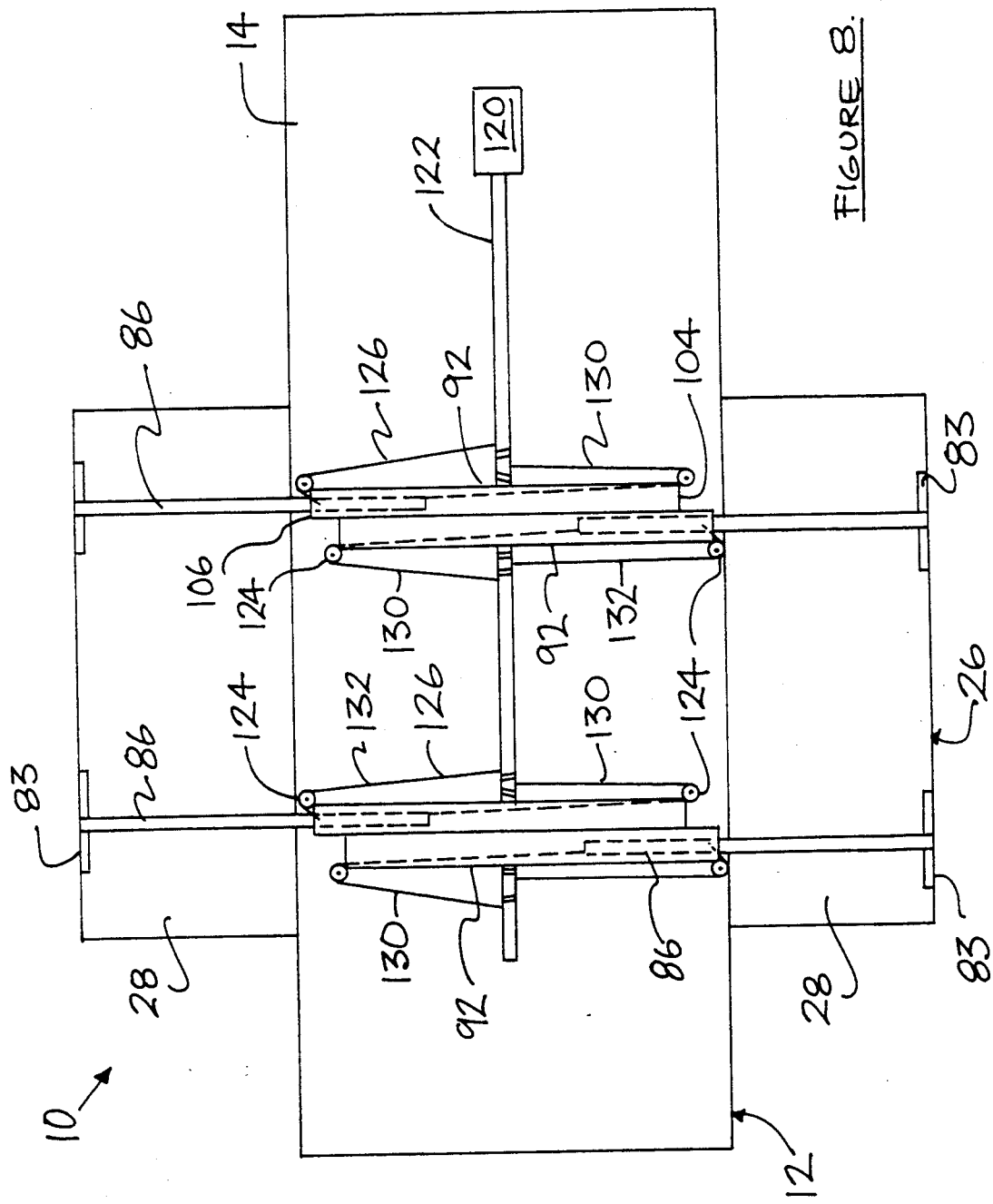
FIG. 8 is a bottom plan view of the expanding caravan of FIG. 5 shown in an expanded condition.

Each second module 26 has two pairs of legs 83 provided thereunder and two members 86, as is best seen in FIGS. 7 and 8. In turn, there is provided one sleeve 92 for each member 86 such that two opposed contiguous sleeves 92 are provided for each second module 26.

Figure 11:
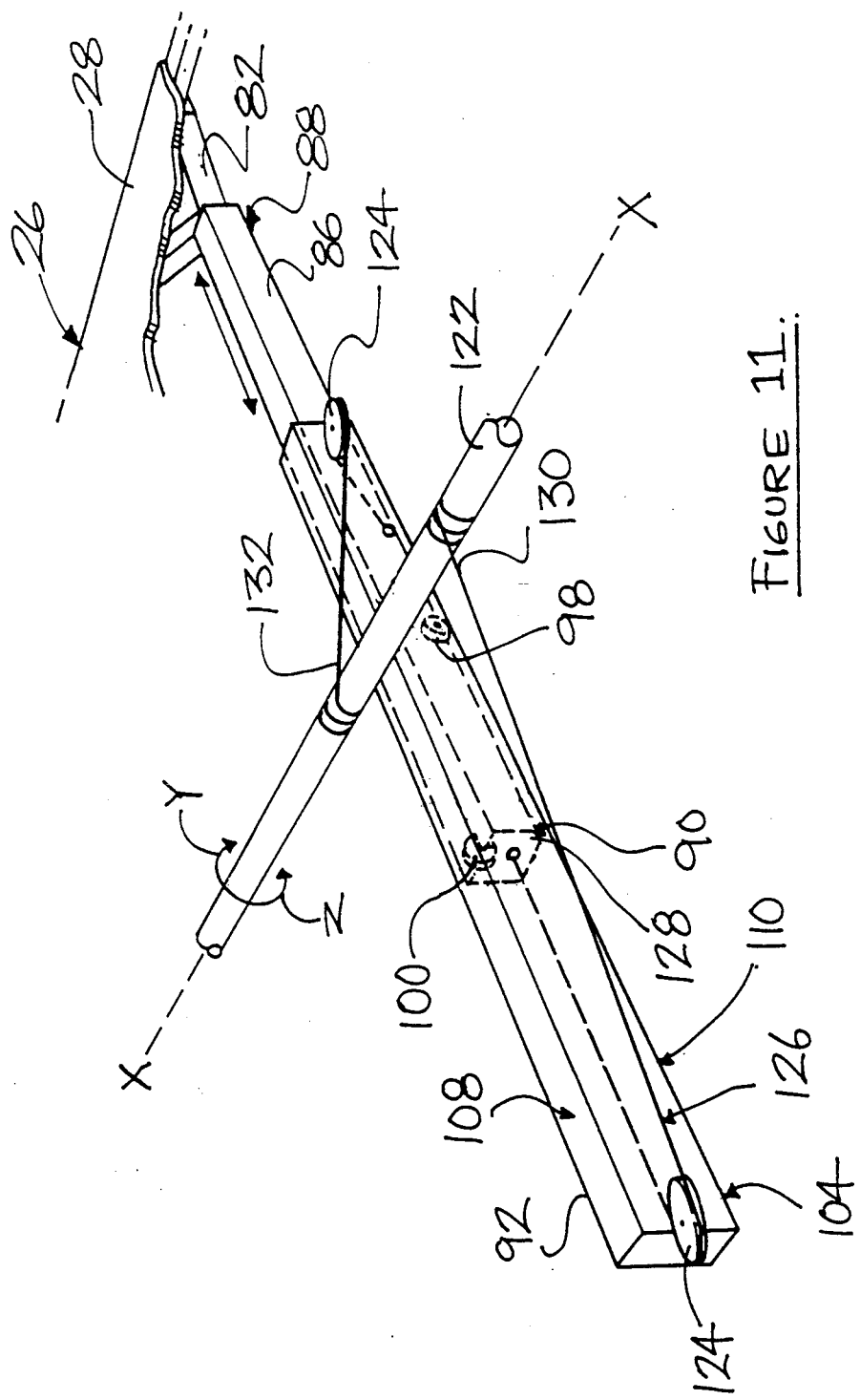
FIG. 11 is an upper perspective sectional view of a mechanism for expansion and contraction of the expanding caravan of FIG. 3.

An electric motor 120 is provided suspended underneath the floor 14 of the first module 12, as is best seen in FIGS. 7 and 8. A shaft 122 extends from the motor 120 longitudinally between the floor 14 and the sleeves 92. The operation of the motor 120 may cause the rotation of the shaft 122 about a longitudinal axis (X—X) as shown in FIG. 11. This rotation may be in a clockwise direction indicated by arrowhead Y or anti-clockwise indicated by arrow head Z.

A number of pulleys 124 are mounted at both the first end 104 and the second end 106 of each sleeve 92, as can be seen in FIGS. 5 to 8 and 11. A respective length of wire means 126 passes around each pulley 124, as is best seen in FIGS. 7, 8 and 11. Each wire means 126 is of a first type 130 or a second type 132. Each first type 130 is attached to the second end 90 of a member 86. Each second type 132 is attached to a member 86 intermediate the ends of the member 86. Each first type 130 and second type 132 is attached to the shaft 122 in a manner such that rotation in one direction will cause one type to wind onto the shaft 122 and the other type to wind off the shaft 122.

Figure 9:
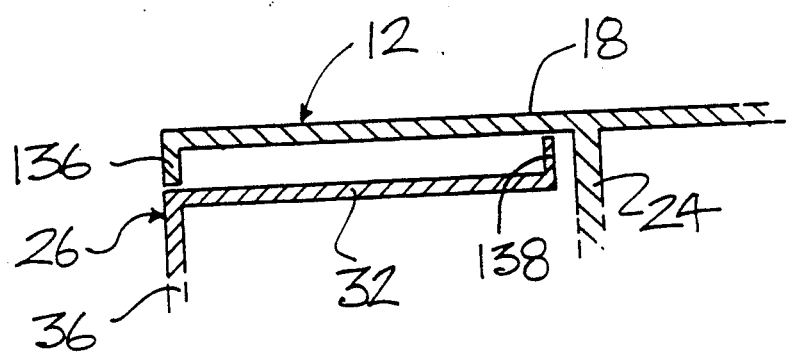
FIG. 9 is a sectional view of a roof of the expanding caravan of the present invention shown in a contracted condition.
Figure 10:
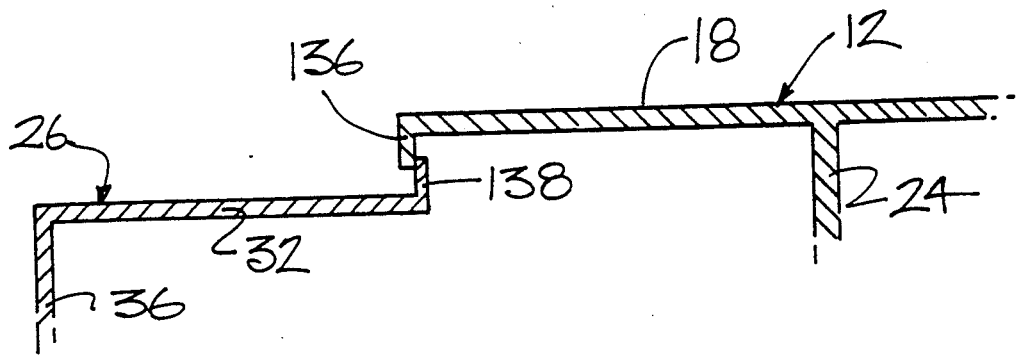
FIG. 10 is a sectional view of the roof of FIG. 9 shown in an expanded condition.

In FIGS. 9 and 10 there is shown an arrangement of the roof 18 of the first module 12 and the roof 32 of the second modules 26. The roof 18 has a pair of opposed downwardly depending flanges 136 on opposite sides of and remote form the central wall 24. Each roof 32 has an upwardly extending flange 138 remote from the outer wall 36.

When the second modules 26 are in a contracted position as shown in FIG. 9 any water or dust would have to follow a sinuous path to infiltrate the interior of the caravan 10. When the second modules 26 are in an expanded position as shown in FIG. 10 the flanges 136 and 138 overlap and contact. This provides an effective seal against ingress of dust and water to the interior of the caravan 10. In use, the caravan 10 is transported to a site in a contracted position as shown in FIGS. 3, 4 and 7. The caravan 10 may then be expanded to increase the usable space for the occupants.

The expansion is achieved by displacing the second modules 26 outwardly away from the central wall 24 of the first module 12. This in turn is achieved by activation of the motor 120. To expand the caravan 10 the motor 120 rotates the shaft 122 in the clockwise direction Y, about the axis (X—X) as shown in FIG. 11.

In the contracted position, each roller 82 is received in a respective recess 78 in the floor 14 of the first module 12. In addition, the rollers 98 on the members 86 are received in a recess 114, as can be seen in FIG. 5. Further, the roller 100, which is mounted centrally in the second end 90 of the member 86, and the second ends 90 of the members 86 are located at the second ends 106 of each sleeve 92. The foregoing serves to inhibit the second modules 26 inadvertently moving away from the module 12. As can be seen in FIG. 11 the first type 130 of the wire means 126 is centrally attached to the end 90 below the roller 100 adjacent the bottom face 96 of the member 86 just inside the member 86. Further, the roller 124 is mounted adjacent the bottom face 96 to align the second type 132 of the wire means 126 (pull in cable end) with the bottom face 96. Also, the first type 130 (or pull out cable end) is mounted to the bottom face 96 centrally thereof as close as possible to the roller 98.

Upon rotation of the shaft 122 in the clockwise direction Y the first type 130 of the wire means 126 is wound off the shaft 122. At the same time the second type 132 is wound onto the shaft 122. The wire means 126 passes around the pulleys 124. As the first type 130 is wound onto the shaft 122 the rollers 98 are moved from recesses 114 and roll along the lower surface 110 of the sleeve 92. At the same time the roller 100 rolls along the top surface of the sleeve 92. The rollers 82 on the floor 28 are concurrently moved from recesses 78 and roll along the floor 14 of the first module 12.

The rotation of the shaft 122 continues to displace the second modules 26 away from the first module 12 until the configuration of FIGS. 6 and 8 is reached.

In FIGS. 6 and 8 the caravan is shown in the expanded position. The floor 28 of the second module 26 has dropped to be level with the floor 14 of the first module. In doing this, the rollers 82 have been received in the recesses in the lower lip 74 and the complementary chamfered edges 72 and 80 have met.

The chamfered edge 72 of the floor 14 supports the chamfered edge 80 of the floor 28.

In turn, the rollers 98 on the members 86 have moved into the recesses 112 at the first end 104 of the sleeves 92. This serves to inhibit the second modules 26 from inadvertently moving toward the first module 12. In total, the floor 28 of the second modules 26 are supported by the chamfered edges 72 and 80 and the members 86. Each member 86 is able to pivot with respect to the floor 28 about the pivot 84. This requirement is introduced because the floor 28 drops in height compared to the members 86 between the contracted and expanded positions. This results in a floor in the expanded caravan 10 that is substantially smooth and free from ridges. As the floors 28 of the second modules 26 drop then the roof 32 thereof must drop also. The roofs 32 of the second modules 26 therefore drop when in the expanded position with respect to the roof 18 of the first module 12, as shown in FIGS. 9 and 10.

In FIG. 9 there is shown the contracted position wherein the roof 32 is relatively below the roof 18. The flange 136 is adjacent the outer wall 36 and the flange 138 is adjacent the central wall 24. This presents a sinuous path against the ingress of dust and water.

In FIG. 10 there is shown the expanded position wherein the roof 32 has moved away from the roof 18. The flanges 136 and 138 contact each other and overlap.

It is envisaged that a foam rubber seal may be used to increase the weatherproofing of the caravan 10. This foam rubber seal could be used on the flanges 136 and 138. It may also be used at the joins between the second modules 26 and the side walls 22 of the first module 12. As may be seen in FIG. 4 the usable floor space is greatly increased when in the expanded position. Once in the caravan 10 is in the expanded condition, the bed 46 may be folded out into a usable position. For this the second portion 66 is pivoted about the hinge 68 from the position shown in FIG. 5 to that in FIG. 6. The chamfered end 64 of the second portion 66 is supported by the chamfered second end 62 of the first portion 58. To return the caravan 10 to the contracted position the motor 120 is activated to rotate the shaft 122 in an anticlockwise direction Z about the axis (X—X), as shown in FIG. 11. The first type 130 of the wire means 126 is wound onto the shaft 122. At the same time the second type 132 is wound off the shaft 122. In this manner the members 86 are drawn into the sleeves 92 and each second module 26 is drawn into the first module 12. This procedure is simply a reversal of that described previously.

It is envisaged that items may be mounted on the central wall 24 or the dividing walls 52. However, these items would have to be attached thereto above the floor 14 to allow room for the floor 28 of the second modules 26 when the caravan is in the contracted position.

It is further envisaged that an expanding caravan 10 may be provided without the motor 120 and shaft 122. Such a caravan would require manual extension and contraction of each second module 26.

The present invention provides a caravan 10 which quickly and easily increases the usable floor space without the need for an annex. Further, the caravan 10 of the present invention is about the same width as a conventional caravan in its contracted position.

Modifications and variations such as would be apparent to a skilled addressee are deemed within the scope of the present invention. For example, the wire means 126 for expanding or contracting the caravan of the present invention can be replaced by any equivalent means such as hydraulic means, pneumatic means or other mechanical means.

I claim:

1. An expanding caravan comprising a first module having a roof, a floor and opposite ends and at least one second module having a roof, a floor and opposite ends receivable by the first module, wherein the caravan has a contracted condition in which the or each second module is received by the first module such that the floor of the or each second module overlies the floor of the first module and an expanded condition in which the or each second module is displaced relative to the first module to increase the usable floor space, the floor of the first module having provided thereunder one or more sleeve members and a corresponding number of sliding members having first and second ends, the or each sleeve member being arranged to receive therein a second end of a respective one of the sliding members while the first end of the sliding member is supportively and pivotally connected to a corresponding one of the second modules.

2. An expanding caravan according to claim 1, in which rollers means are provided under the floor of the or each second module resting on the floor of the first module in the contracted condition to allow a smoother transition to the expanded position.

3. An expanding caravan according to claim 2, in which recesses are provided in the floor of the first module to receive the roller means under the floor of the or each second module either when in the fully contracted position or the fully expanded positions.

4. An expanding caravan according to claim 1, in which roller means are provided on the sliding member to allow smoother travel thereof within the sleeve member when moving between the contracted and expanded conditions.

5. An expanding caravan according to claim 4, in which recesses are provided in the sleeve member to receive the roller means on the sliding members either when in the fully contracted condition or the fully expanded condition.

6. An expanding caravan according to claim 1, in which a motor is provided to move the sliding members.

7. An expanding caravan according to claim 1, in which a chamfered longitudinal outside edge is provided on the floor of the first module and a complementary chamfered longitudinal inside edge is provided on the floor of the or each second module such that the chamfered edges engage to support the or each second module when such is in the expanded condition.

8. An expanding caravan according to claim 1, in which the roof of the first module has a downwardly depending flange at an outer edge thereof and the roof of the or each second module has an upwardly extending flange at an inner edge thereof such that both flanges engage when the or each module is in an extended condition thereby presenting a seal against the elements.

9. An expanding caravan according to claim 1, in which the or each sliding member has attached at its second end a first type of wire means and extending out of a first end of the sleeve member in which that sliding member is received, a second type of wire means being attached to the or each sliding member at a point intermediate the ends thereof and extending out of a second end of the sleeve member, each wire means being attached to a shaft provided under the floor of the first module in such a manner that rotation of the shaft will cause one type to be wound onto the shaft and the other type to be wound off the shaft.

10. An expanding caravan according to claim 9, in which rotation of the shaft in one direction causes the wire attached to the or each sliding member to pull the sliding member away from the sleeve member thereby extending the second module connected thereto away from the first module whereas rotation of the shaft in the opposite direction causes the wire attached to the or each sliding member to pull the sliding member into the sleeve member thereby contracting the second module connected thereto.

11. An expanding caravan according to claim 9, in which the shaft runs longitudinally under the first module whereas the or each sleeve member and the corresponding sliding member runs transversely thereto.

* * * * *